(12) United States Patent
Schondorf

(10) Patent No.: US 6,476,514 B1
(45) Date of Patent: Nov. 5, 2002

(54) OCCUPANT DETECTION SENSOR ASSEMBLY FOR SEATS

(75) Inventor: Steven Yellin Schondorf, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/537,503

(22) Filed: Mar. 29, 2000

(51) Int. Cl.⁷ .................................................. B60L 1/00
(52) U.S. Cl. .................. 307/10.1; 307/9.1; 701/45; 180/273; 180/271; 280/735; 340/667
(58) Field of Search ................................. 307/10.1, 9.1; 701/45; 280/735; 130/273, 271; 340/667

(56) References Cited

U.S. PATENT DOCUMENTS

| | | | |
|---|---|---|---|
| 5,413,378 A | 5/1995 | Steffens, Jr. et al. | |
| 5,474,327 A | 12/1995 | Schousek | |
| 5,481,078 A | 1/1996 | Asche | |
| 5,739,757 A | 4/1998 | Gioutos | |
| 5,864,295 A | 1/1999 | Jarocha | |
| 5,877,677 A | 3/1999 | Fleming et al. | |
| 5,905,210 A | 5/1999 | O'Boyle et al. | |
| 5,918,696 A | 7/1999 | Van Voorhies | |
| 5,927,427 A | 7/1999 | Sewell et al. | |
| 5,957,491 A | 9/1999 | Cech et al. | |
| 6,021,863 A | * 2/2000 | Stanley | 180/273 |
| 6,056,079 A | * 5/2000 | Cech et al. | 180/273 |
| 6,101,436 A | * 8/2000 | Fortune et al. | 701/45 |
| 6,242,820 B1 | * 1/2001 | Shankar et al. | 307/10.1 |

FOREIGN PATENT DOCUMENTS

| | | |
|---|---|---|
| EP | 0 670 239 A1 | 9/1995 |
| EP | 0 689 967 A1 | 1/1996 |
| EP | 0 721 863 A2 | 7/1996 |
| EP | 0 796 768 A1 | 9/1997 |
| EP | 0 900 705 A2 | 3/1999 |
| JP | 10-16703 | 1/1998 |
| JP | 10-194024 | 7/1998 |
| JP | 10-214537 | 8/1998 |
| JP | 10-236274 | 9/1998 |
| JP | 10-236275 | 9/1998 |
| JP | 10-244861 | 9/1998 |
| JP | 11-1153 | 1/1999 |
| JP | 11-115678 | 4/1999 |
| JP | WO 99/24285 | 5/1999 |
| WO | WO 98/22920 | 5/1998 |
| WO | WO 98/25112 | 6/1998 |
| WO | WO 98/26961 | 6/1998 |
| WO | WO 98/29719 | 7/1998 |
| WO | WO 98/29849 | 7/1998 |
| WO | WO 98/30411 | 7/1998 |
| WO | WO 98/30413 | 7/1998 |
| WO | WO 98/30874 | 7/1998 |
| WO | WO 98/31992 | 7/1998 |
| WO | WO 98/34205 | 8/1998 |
| WO | WO 98/35861 | 8/1998 |
| WO | WO 98/41424 | 9/1998 |
| WO | WO 99/11483 | 3/1999 |
| WO | WO 99/11484 | 3/1999 |
| WO | WO 99/14571 | 3/1999 |
| WO | WO 99/25589 | 5/1999 |
| WO | WO 99/26049 | 5/1999 |
| WO | WO 99/26084 | 5/1999 |
| WO | WO 99/30934 | 6/1999 |

* cited by examiner

Primary Examiner—Stephen W. Jackson
Assistant Examiner—Robert L. Deberadinis
(74) Attorney, Agent, or Firm—David B. Kelley

(57) ABSTRACT

An occupant detection sensor assembly for a motor vehicle includes a generally horizontal seat cushion portion and a generally upright back portion operatively connected to the seat cushion portion. The occupant detection sensor assembly includes a seat cushion disposed within the seat cushion portion of the seat having at least one channel therein. The occupant detection sensor assembly also includes at least one sensor connected to the seat cushion and communicating with the at least one channel. The occupant detection sensor assembly further includes an electronic controller electrically connected to the at least one sensor for detecting an occupant seated on the seat cushion portion.

18 Claims, 2 Drawing Sheets

OCCUPANT DETECTION SENSOR ASSEMBLY FOR SEATS

BACKGROUND OF THE INVENTION

1. Field of the Invention

The present invention relates generally to seats for motor vehicles and, more specifically, to an occupant detection sensor assembly for a seat in a motor vehicle.

2. Description of the Related Art

It is known to provide seats for motor vehicles such as an automotive vehicle. Typically, a seat includes a generally horizontal seat cushion portion and a generally vertical seat back portion operatively connected to the seat cushion portion.

It is also known to provide a seat weight sensor for the seat cushion portion of the seat in a motor vehicle. For example, the seat weight sensor may be of a bladder type that requires a silicone-filled bladder be added to the seat cushion portion. The seat weight sensor measures changes in the pressure of the silicone-filled bladder and uses the output to infer the weight of an occupant sitting in the seat. In another example, a seat weight sensor uses a mat covered with force sensitive resistors installed inside a seat foam of the seat cushion portion to measure pressure distribution across the mat. The output of the seat weight sensor is used to infer occupant size. In still another example, a seat weight sensor uses a light source and a light detector inside the seat foam of the seat cushion portion to detect compression of the seat foam. Compressed seat foam generates a different light intensity than uncompressed seat foam. In the seat weight sensor, multiple light sources and detectors allow an approximation of weight distribution of the seat cushion portion to be calculated.

One disadvantage of the above seat weight sensors is that a bladder or matt is needed, which is undesired. Another disadvantage is that the seat weight sensors require components to be disposed inside the seat cushion portion, which is undesired. A further disadvantage is that the above seat weight sensors are used to measure the weight of an occupant and not for detecting an occupant in the seat.

SUMMARY OF THE INVENTION

Accordingly, the present invention is an occupant detection sensor assembly for a seat in a motor vehicle including a generally horizontal seat cushion portion operatively connected to vehicle structure and a generally upright seat back portion operatively connected to the seat cushion portion. The occupant detection sensor assembly includes a seat cushion disposed within the seat cushion portion of the seat having at least one channel therein. The occupant detection sensor assembly also includes at least one sensor connected to the seat cushion and communicating with the at least one channel and an electronic controller electrically connected to the at least one sensor for detecting an occupant seated on the seat cushion portion.

One advantage of the present invention is that an occupant detection sensor assembly is provided for a seat in a motor vehicle. Another advantage of the present invention is that the occupant detection sensor assembly detects or classifies an occupant in the seat, either their presence, their size, or their humanness. Yet another advantage of the present invention is that the occupant detection sensor assembly uses the seat foam itself as the medium for the sensor elements. Still another advantage of the present invention is that the occupant detection sensor assembly does not require components, other than sensors, to be disposed inside the seat cushion portion of the seat.

Other features and advantages of the present invention will be readily appreciated, as the same becomes better understood after reading the subsequent description when taken in conjunction with the accompanying drawings.

DESCRIPTION OF THE PREFERRED EMBODIMENT(S)

Figure 1:
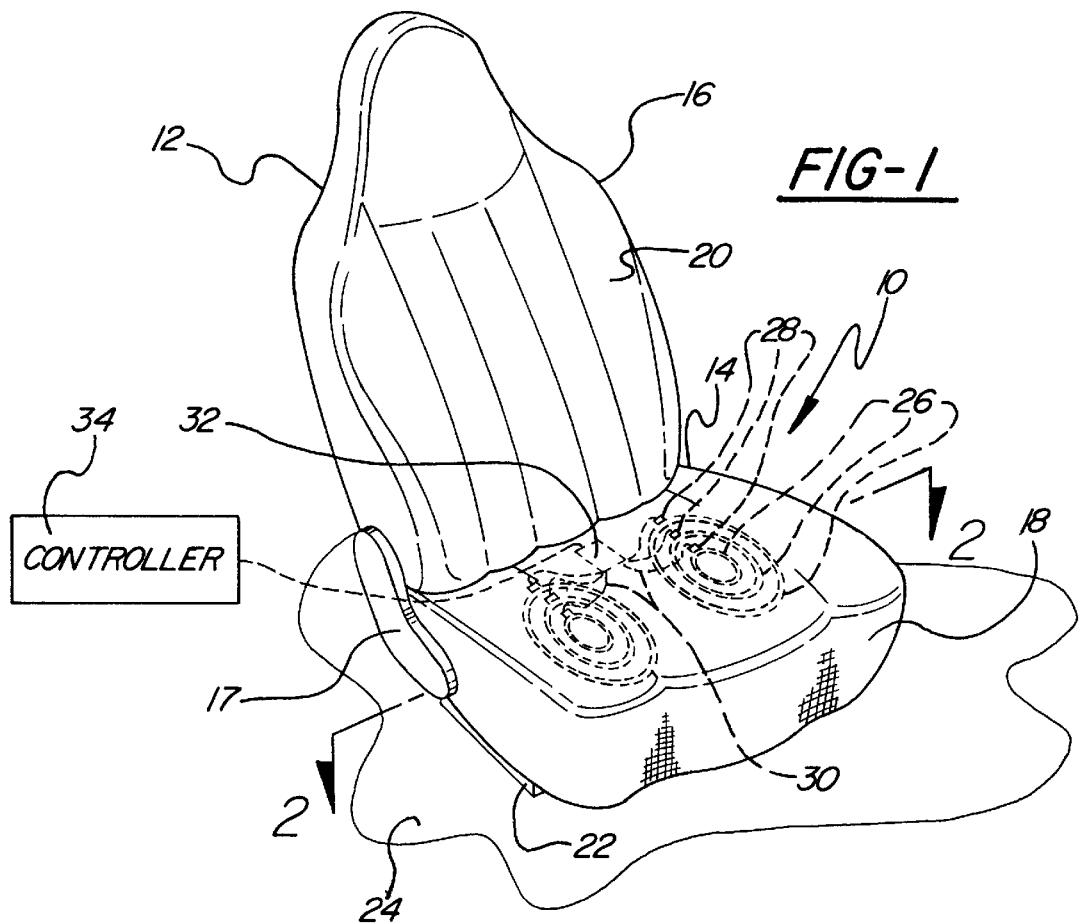
FIG. 1 is a perspective view of an occupant detection sensor assembly, according to the present invention, illustrated in operational relationship with a seat.
Figure 2:
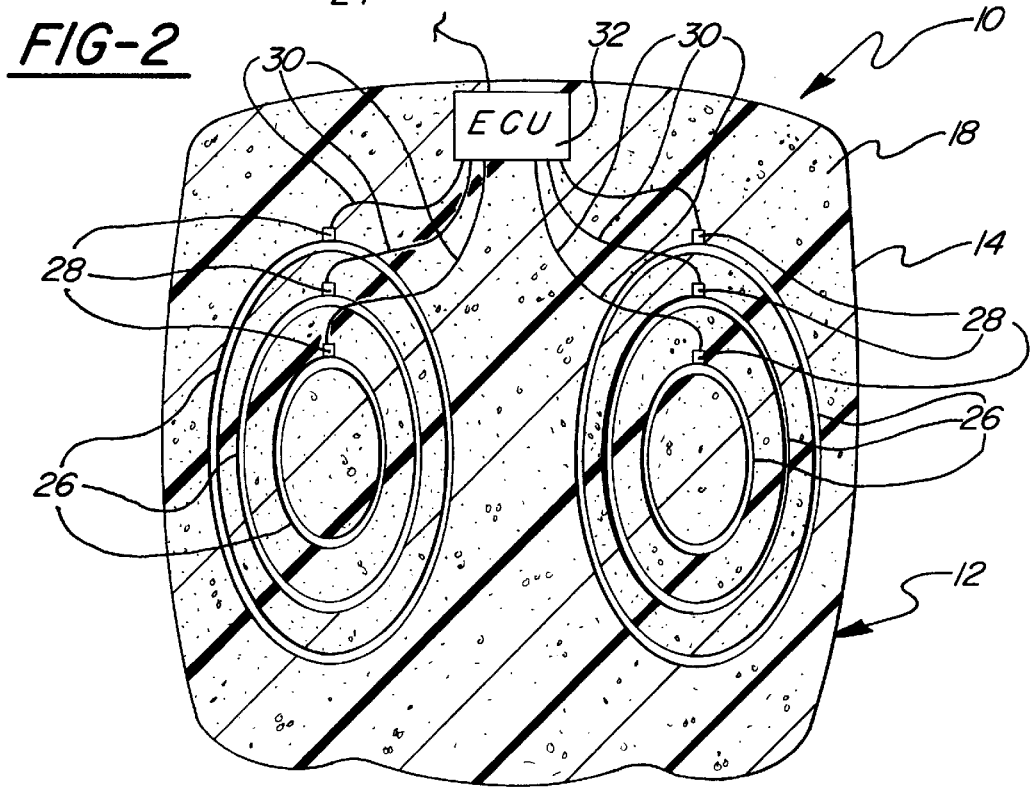
FIG. 2 is a sectional view taken along line 2—2 of FIG. 1.
Figure 3:
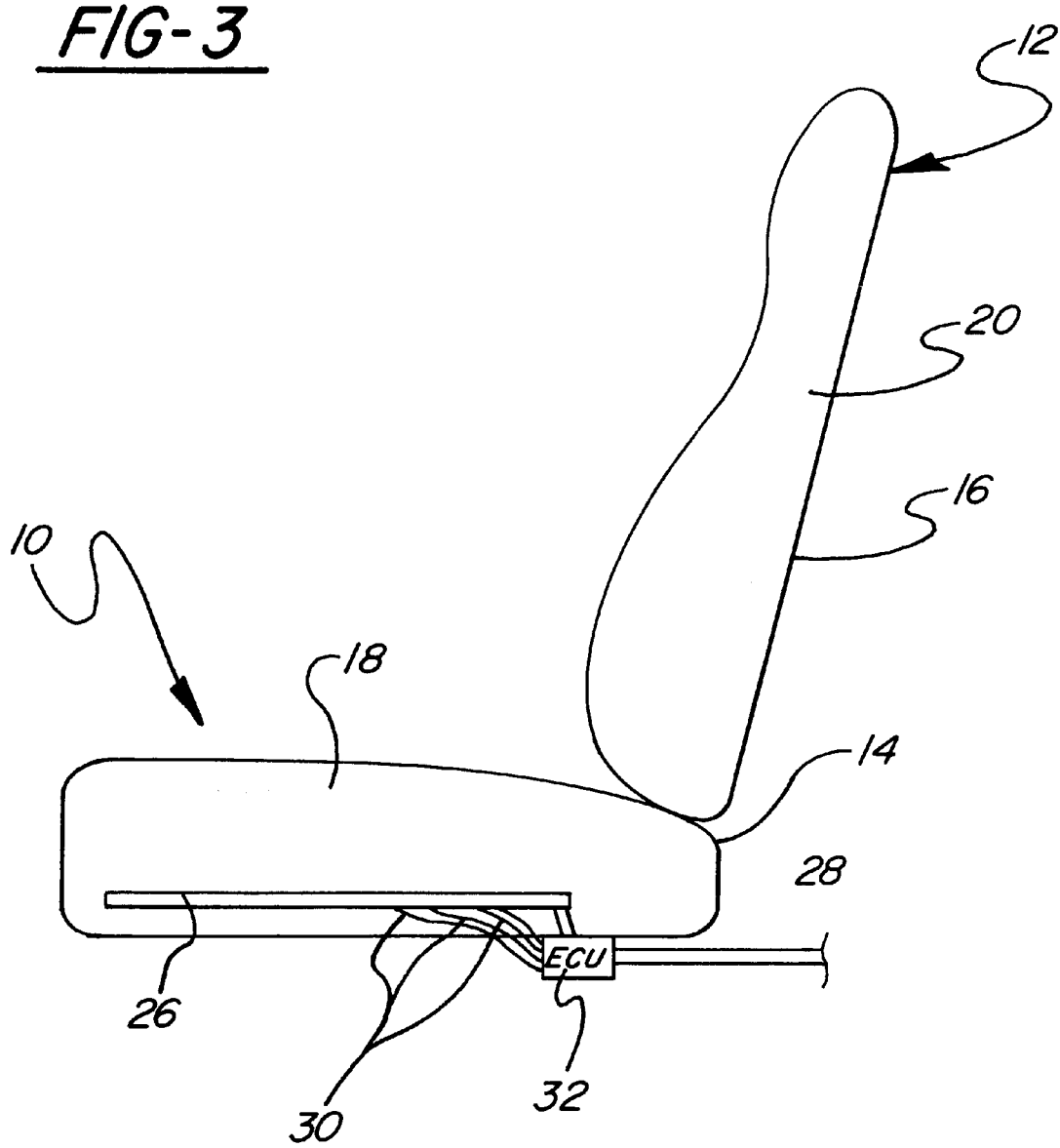
FIG. 3 is a side elevational view of the occupant detection sensor assembly of FIG. 1.

Referring now to the drawings and in particular FIGS. 1 through 3, one embodiment of an occupant detection sensor assembly 10, according to the present invention, is shown for a seat, generally indicated at 12, of a motor vehicle (not shown). The seat 12 includes a generally horizontal seat cushion portion 14 and a generally upright seat back portion 16 pivotally connected to the seat cushion portion 14 by a seat back pivot 17. The seat cushion portion 14 includes a seat pan (not shown) and a seat cushion 18 operatively connected to the seat pan by suitable means such as an adhesive. The seat back portion 16 includes a seat back frame (not shown) and a back cushion 20 disposed about and operatively connected to the seat back frame by suitable means such as an adhesive. The seat 12 includes a track or lower seat frame member 22 mounted to the seat pan and vehicle structure 24 such as a floorpan. It should be appreciated that, except for the occupant detection sensor assembly 10, the seat 12 is conventional and known in the art.

As illustrated in FIGS. 1 through 3, the occupant detection sensor assembly 10 includes the seat cushion 18 being made of a foam material such as a polyurethane foam. The seat cushion 18 has at least one, preferably a plurality of capillaries or channels 26 disposed therein. The channels 26 are integral to the foam material. Each of the channels 26 forms a closed loop and has a generally circular shape, but may have any suitable shape. The channels 26 have a generally circular cross-sectional shape, but may have any suitable cross-sectional shape. In the embodiment illustrated, the channels 26 are concentric relative to each other. Also, the channels 26 are divided into concentric sets of three thereof and spaced laterally. It should be appreciated that the channels 26 may be non-concentric and not disposed concentric or about each other. It should also be appreciated that the layout of the channels 26 can be customized for optimal sensing in a given seat configuration.

The occupant detection sensor assembly 10 also includes at least one, preferably a plurality of sensors 28 connected to and cooperating with the channels 26. The sensors 26 are of a pressure sensing type. In the embodiment illustrated, one sensor 28 is associated with one channel 26. The sensors 28 are connected by suitable means such as wires 30 to a source of power such as a controller 32 to be described. It should be appreciated that the sensors 28 are disposed inside the seat cushion 18 and that the wires 30 extend from the sensors 28 through the seat cushion 18. It should also be appreciated that the output from the sensors 28 can be absolute weight in pounds or to generate weight distribution that can be used for occupant classification. It should further be appreciated that the medium inside the channels 26 of the foam material of the seat cushion 18 becomes the medium for pressure sensing.

The occupant detection sensor assembly 10 further includes an electronic control unit (ECU) 32 connected by the wires 30 to each of the sensors 28. The ECU 32 is disposed below the seat cushion 18 and mounted to suitable structure such as the seat pan. The wires 30 extend from the ECU 32 through the seat cushion 18 to the sensors 28. The ECU 32 receives signals from the sensors 28 and sends a signal to an electronic controller 34 such as an air bag or restraint control module. It should be appreciated that the ECU 32 is connected by at least one circuit to the electronic controller 34. It should also be appreciated that the ECU 32 and electronic controller 34 are conventional and known in the art.

The occupant detection sensor assembly 10 may include a fluid in the channels 26 of the seat cushion 18. The fluid may be air, a liquid or a gel such as silicone. The sensors 28 sense a change in pressure of the fluid when the seat cushion 18 is compressed. It should be appreciated that, in the preferred embodiment, the fluid is air and the sensors 28 detect a change in pressure of the air in the channels 26.

In operation of the occupant detection sensor assembly 10, when the seat 12 is unoccupied, the sensors 28 measure a base pressure of the fluid in the channels 26. When an occupant sits in the seat 12, the seat cushion 18 is compressed, causing an increased pressure in the fluid of the channels 26. The sensors 28 sense or measure the difference in pressure and sense signals to the ECU 32. The ECU 32 processes the signals from the sensors 28 and a signal is sent to the electronic controller 34. The electronic controller 34 uses this signal in determining whether an occupant is seated in the seat 12. It should be appreciated that, when the occupant exits the seat 12, the seat cushion 18 expands to its original position and the pressure of the fluid in the channels 26 returns to the base value.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An occupant detection sensor assembly for a seat in a motor vehicle having a generally horizontal seat cushion portion and a generally upright seat back portion operatively connected to the seat cushion portion, said occupant detection sensor assembly comprising:
    a seat cushion disposed within the seat cushion portion of the seat being made of a foam material having a plurality of discrete spaced channels therein integral to said foam material;
    a plurality of sensors connected to said seat cushion, one of said sensors communicating with one of said channels; and
    an electronic controller electrically connected to said sensors for detecting an occupant seated on the seat cushion portion.

2. An occupant detection sensor assembly as set forth in claim 1 wherein said sensors are of a pressure sensing type.

3. An occupant detection sensor assembly as set forth in claim 1 wherein said channels are filled with a fluid.

4. An occupant detection sensor assembly as set forth in claim 3 wherein said fluid is either one of a gas, liquid, and gel.

5. An occupant detection sensor assembly as set forth in claim 1 wherein said controller is disposed outside of said seat cushion.

6. An occupant detection sensor assembly as set forth in claim 5 including a plurality of wires interconnecting said sensors and said controller.

7. An occupant detection sensor assembly as set forth in claim 6 wherein said wires extend through said seat cushion.

8. An occupant detection sensor assembly as set forth in claim 1 wherein said channels are concentric relative to each other.

9. An occupant detection sensor assembly as set forth in claim 1 wherein each of said channels form a closed loop.

10. An occupant detection sensor assembly as set forth in claim 1 wherein said channels are generally circular in shape.

11. A seat assembly for a motor vehicle comprising:
    a seat cushion portion operatively connected to vehicle structure, said seat cushion portion including a seat cushion disposed therein being made of a foam material having a plurality of discrete spaced channels therein integral to said foam material;
    a seat back portion operatively connected to said seat cushion portion; and
    an occupant detection sensor assembly including a plurality of sensors connected to said seat cushion, one of said sensors communicating with one of said channels; and
    an electronic controller electrically connected to said sensors for detecting an occupant seated on the seat cushion portion.

12. A seat assembly as set forth in claim 11 wherein said sensors are of a pressure sensing type.

13. A seat assembly as set forth in claim 11 wherein said channels are filled with a fluid.

14. A seat assembly as set forth in claim 13 wherein said fluid is either one of a gas, liquid, and gel.

15. A seat assembly as set forth in claim 11 wherein said controller is disposed outside of said seat cushion.

16. A seat assembly as set forth in claim 15 including a plurality of wires interconnecting said sensors and said controller.

17. A seat assembly as set forth in claim 16 wherein said wires extend through said seat cushion.

18. A seat assembly for a motor vehicle comprising:
    a seat cushion portion operatively connected to vehicle structure, said seat cushion portion including a seat cushion disposed therein being made of a foam material having a plurality of discrete spaced channels therein integral to said foam material, said channels being concentric relative to each other and each of said channels forming a closed loop;
    a seat back portion operatively connected to said seat cushion portion;
    an occupant detection sensor assembly including a plurality of sensors connected to said seat cushion, one of said sensors communicating with one of said channels; and
    an electronic controller electrically connected to said sensors for detecting an occupant seated on the seat cushion portion.

* * * * *